United States Patent [19]

Vacilotto

[11] Patent Number: 4,879,770
[45] Date of Patent: Nov. 14, 1989

[54] EYEWEAR

[76] Inventor: Steven J. Vacilotto, 22 North Park Drive, North York, Ontario, Canada, M6L 1K2

[21] Appl. No.: 115,794

[22] Filed: Nov. 2, 1987

[51] Int. Cl.⁴ .............................................. A61F 9/02
[52] U.S. Cl. ......................................... 2/441; 351/86
[58] Field of Search .................. 2/441, 443, 426, 439; 351/47, 86, 41

[56] References Cited

U.S. PATENT DOCUMENTS

| | | | |
|---|---|---|---|
| 2,388,635 | 11/1945 | Ditto | 2/441 |
| 2,391,361 | 12/1945 | Stevenson | 2/441 |
| 2,846,684 | 8/1958 | Hill | 2/441 |
| 3,453,042 | 7/1969 | Cooper | 351/41 X |
| 3,689,136 | 9/1972 | Atamian | 2/443 X |
| 3,884,561 | 5/1975 | Kodys | 351/86 X |
| 4,689,838 | 9/1987 | Angermann et al. | 2/441 |

FOREIGN PATENT DOCUMENTS

| | | | |
|---|---|---|---|
| 0416899 | 12/1946 | Italy | 351/47 |
| 2123574 | 2/1984 | United Kingdom | 351/86 |

Primary Examiner—Peter Nerbun
Attorney, Agent, or Firm—Kenneth M. Garrett

[57] ABSTRACT

Eyewear such as sunglasses comprises a one-part lens and a frame therefor having a continuous channel therearound into which the lens is receivable. Preferably at least one of the lens and the frame are elastically deformed when the lens is engaed in the frame, so tending to strengthen the lens-frame combination. Suitably the channel has a non-uniform depth in preselected portions along its length, whereby different frames may have a different appearance while utilizing identical lens. The frames suitably include a gate which may be opened to provide access to the channel when inserting or removing the lens.

10 Claims, 3 Drawing Sheets

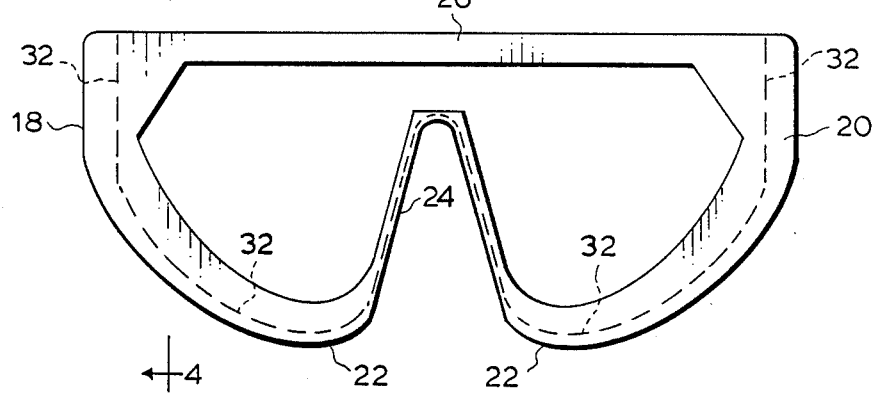
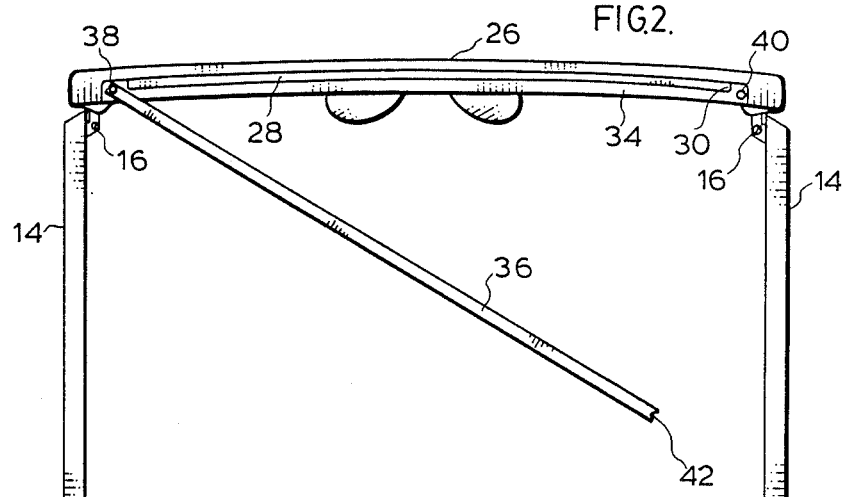
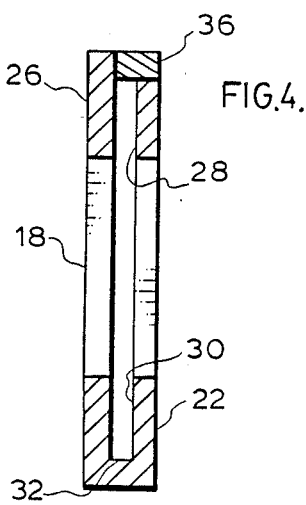

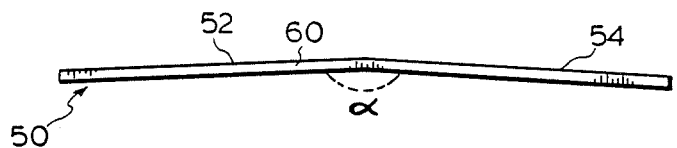
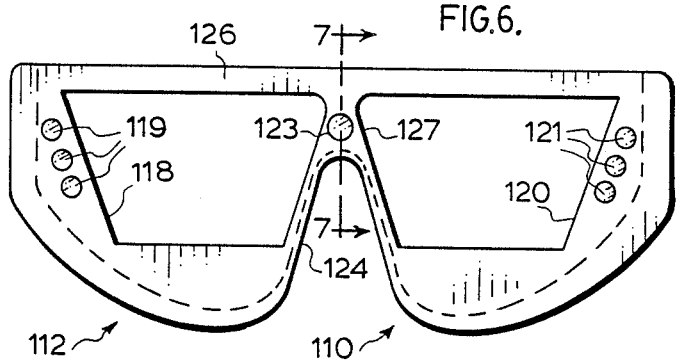
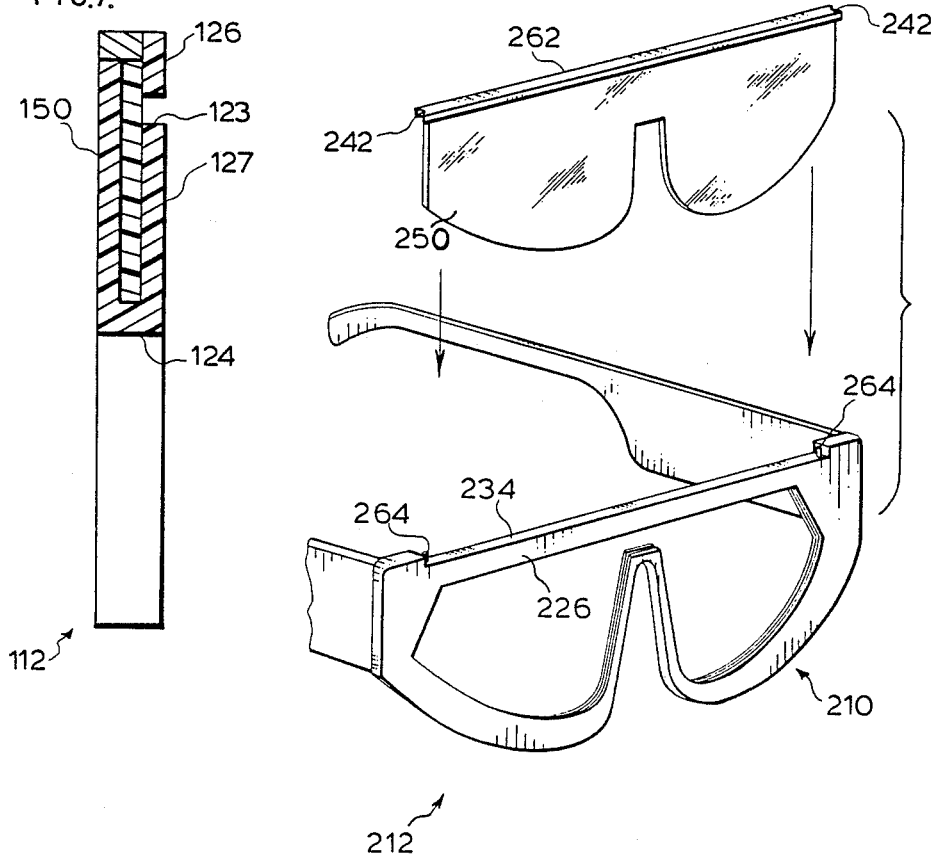

EYEWEAR

FIELD OF INVENTION

This invention relates to eyewear such as sunglasses. It particularly relates to eyewear comprising a relatively rigid frame, such as is normally supported from the head of a user by temples and nose bridge. It especially relates to eyewear having provision for replaceable lens.

BACKGROUND OF INVENTION

There have been many proposals heretofore for the provisions of eyewear of the foregoing nature. Thus, in U.S. Pat. No. 3,229,303 to Jonassen, the frame was provided with channels opening to each lateral side thereof, and lens were insertable into the frame, one lens from each side to be locked in place by the temples. In U.S. Pat. No. 3,685,889, to Thatcher, the frame was provided with bottom opening channels into which lens were insertable, and held in place frictionally. In U.S. Pat. No. 3,689,136, to Atamian, the frame was provided with top opening channels into which lens were insertable.

In U.S. Pat. No. 3,453,042, to Cooper, the frame was provided with rearwardly opening sockets into which the lens were receivable, to be retained in place by lips opposed to the socket and a tube and post arrangement.

In the first three of the foregoing proposals separate left and right lens were provided for insertion into the channels of the frame. In the last of the proposals, the lens were unified by a plate which carried part of the retaining means and also nose contacting guards.

It is an object of this invention to provide eyewear of a simplified type having a replaceable lens wherein the lens is a unitary nature.

It is another object of the invention to provide eyewear which may present itself in differing aesthetic appearance.

It is another object of the invention to provide eyewear wherein the lens tends to cooperate with and rigidify the frame.

SUMMARY OF THE INVENTION

In accordance with one aspect of the invention, eyewear comprises a unitary lens, and a frame therefor. The frame comprises opposed side portions which are bridged by a nose portion. The inner periphery of the side portion and the nose portion is provided with a channel extending continuously therealong. The frame further comprises a top member which interconnects between the side portions adjacent their upper ends. At least a portion of the top member is movable between a first position wherein the channel is open along its length, to permit the lens to enter therein, and a second position where it acts to lock the lens in the channel.

Suitably the top member includes a portion that is permanently secured to the side portions, to thereby provide a more rigid structure. Generally the top member will have the same front to back thickness as side portions of the frame, and be slotted along its length to communicate with the channel. In accordance with the preferred embodiment, the permanently secured top portion of the top member rearwardly of the channel is downwardly stepped along its upper edge, and the movable portion has a complementary form to the downward step. This complementary movable portion is suitably hinged adjacent one end thereof by a vertical hinge pin, and the other end of the movable portion snaps into a locked position to assist in rigidifying the assembly.

In accordance with another embodiment, the movable portion is unified with the lens, and is moved into engagement with the frame as the lens is inserted into the slot and channel.

The assembly is desirably rigidified by providing an interference between the frame and the lens. Such interference is provided in the preferred embodiment by forming the lens receiving channel in one plane and the lens in two planes intersecting at a shallow angle about a vertical mid-line. As the lens is moved into engagement with the channel, so the frame and lens each elastically deform somewhat, with the lens interfering with the channel walls to assist in regidifying the structure. More generally expressed, the locus of peripheral points of the lens in at least the medial horizontal section thereof are made to differ from the locus of corresponding parts on the channel, taken when the lens is disengaged from the frame, whereby when the lens is inserted into the channel, at least one of the lens and the frame is marginally distorted about a vertical centre line, thereby tending to wedge the lens into the frame.

These objects aims and advantages of the invention, and other objects aims and advantages will become more apparent from a consideration of the preferred embodiments thereof, taken in conjunction with the accompanying drawings.

BRIEF DESCRIPTION OF THE DRAWINGS

FIG. 2 shows the eyewear of FIG. 1 in plan view from above;

FIG. 3 shows the eyewear of FIG. 1 in front elevation;

FIG. 4 is a sectional view along 4-4 of FIG. 3;

FIG. 5 shows the lens component of the eyewear of FIG. 1 in plan view from above;

FIG. 6 shows in front elevation a second embodiment of the invention;

FIG. 7 is a sectional view along 7-7 of FIG. 6, and

FIG. 8 shows in frontal perspective elevation a third embodiment of the invention.

DESCRIPTION OF THE PREFERRED EMBODIMENT

Figure 1:
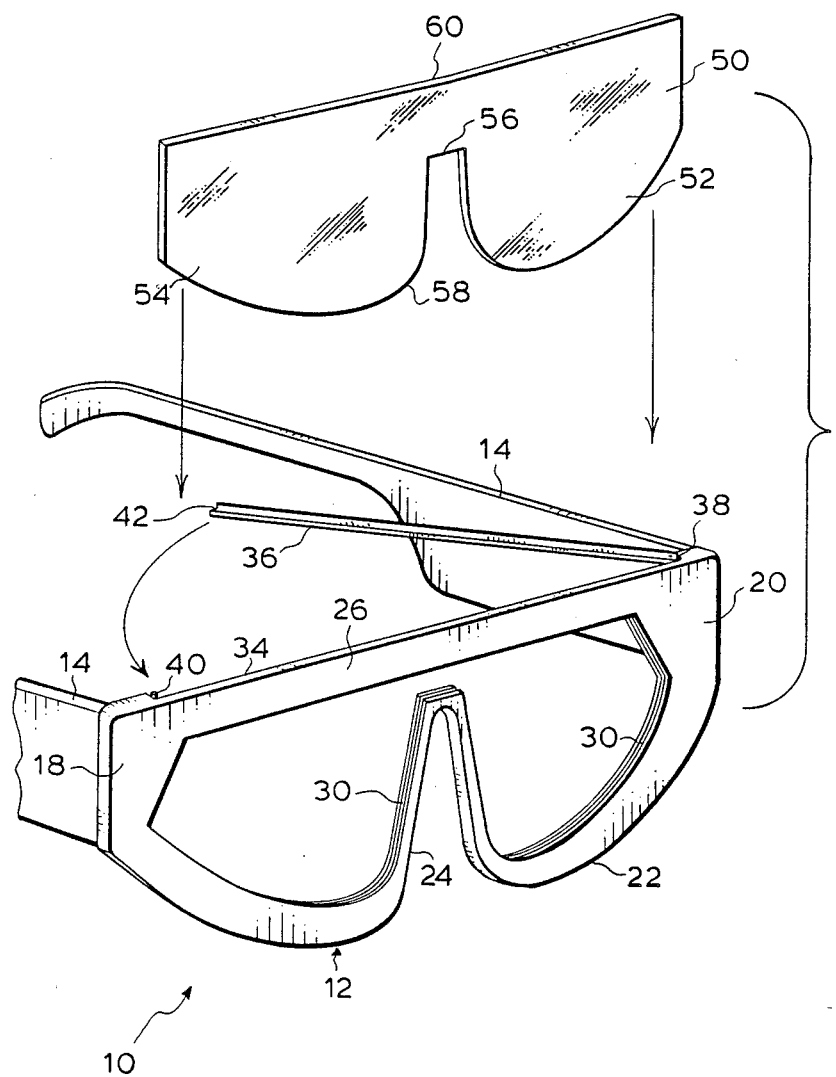
FIG. 1 shows eyewear in accordance with the invention in frontal perspective, exploded view.

Referring to the drawings in detail, eyewear constructed in accordance with a first embodiment of the invention is identified generally by the numeral 10. Eyewear 10 comprises a frame 12 and temples 14 secured thereto at each lateral side thereof by hinges 16. Frame 12 comprises laterally opposed side portions 18, 20 interconnected adjacent their lower ends by a bridge 22 including a nose portion 24 in the form of an inverted U, and adjacent the upper ends by a top member 26. Top member 26 is slotted at 28 substantially along its length, and frame portions 18, 20 and 22 are provided with a continuous channel 30 which connects to slot 28. The lower wall of channel 30 is shown in dashed outline in FIG. 3, where it is identified by the numeral 32, from which it may be seen that the depth of the channel is made to be non uniform along its length, for a purpose to be described later.

The edge of top member 26 rearwardly of slot 28 is downwardly stepped at 34, the step extending marginally beyond each lateral side of channel bottom 32 where it exits the side portions 18, 20 of frame 12. A closure bar 36 having a length substantially equal to the length of step 34 is hinged to side portion 18 at the upper extremity thereof by a vertically oriented pivot pin 38. A similar pin 40 locates at the laterally opposed end of step 34; the end of closure bar 36 is profiled at 43 to engage behind pin 40 when the closure bar is in alignment with the forward portion of top frame member 26, in which position the closure bar serves to close off access to slot 28 and the entry to channel 30.

Eyewear 10 further comprises a unitary lens 50 having left and right eye screening portions respectively numbered 52, 54 interconnected by a central portion 56. Lens 50 is conveniently struck from sheet plastic material, and has a thickness such that it is receivable through slot 28 into channel 30, and a lower perimeter 58 complementary to channel bottom 32 so as to be contiguous therewith when the upper edge 60 of the lens is flush with, or marginally below, the bottom of step 34 with lens 50 so located in frame 12, closure bar 36 is moved to its closure position to retain the lens in secured position.

It is, of course, possible to construct both frame 12 and lens 50 of relatively heavy gauge materials and/or the so called engineering plastics, which is to say plastic materials having high tensile strengths i.e. hard plastic material, to thereby form a relatively durable structure. However, such structure would be aesthetically unpleasing, and/or the cost would be disproportionately high. In order to provide eyewear having a relatvely rigid i.e. hard construction without resorting to the foregoing expedients, a relatively strong interference is provided between the frame 12 and lens 50 by two means. Thus, lens 50 is formed in a shallow V shape, as best seen in FIG. 5, the angle between the left and right portions thereof being conveniently about 175° ; frame 12 is conveniently planar (or more particularly slot 32 and channel 30 reside in the same plane).

Manual pressure is applied at each lateral side of frame 12 to resiliently deform the frame into a shallow V shape as lens 50 is engaged therewith. The ultimate shape assumed by the frame 12 when the lens 50 is fully engaged therewith will depend upon the relative strengths of the frame and lens, but each will be deformed somewhat so as to provide the requisite interference between peripheral portions of the lens and the walls defining channel 30 and slot 28.

The degree of interference between frame 12 and lens 50 is further increased by making channel 30 relatively deep in selected portions of the frame, such as at portions 52 and 54 of the frame, which will additionally have the effect of permitting ready changes to the aesthetic appearance of eyewear 10.

In the embodiment of FIG. 6, eyewear 110 comprises a frame 112 having a generally identical outer peripheral shape as in FIG. 1, and a channel bottom 132 identical in profile to channel bottom 32. However, the depth of the channel in side portions 118, 120 will be seen to differ from corresponding portions 18, 20 of the embodiment of FIG. 1, whereby eyewear 110 has a different appearance to eyewear 10, while the same lens 50 may be used in each. The depth of the channel in frame portions other than 18, 20 may vary in depth, as may the depth of central member 26 and channel 28 therethrough, to provide an infinite variety of guises for the eyewear. Thus, as also suggested in FIG. 6, central portions 127 of top member 126 project downwardly to meet nose portion 124, again changing the visual appearance of the eyewear. Central portion 127 is slotted so as to meet with channel 30 in the vicinity of nose portion 124, whereby lens 45 may be used in this embodiment also. The visual appearance of the eyewar may be still further altered by providing openings through wider parts of the frame which intersect the channel thereby revealing the lens, as suggested at opening 119, 121 and 123.

In the embodiment of FIG. 8, eyewear 210 comprises a frame 212 similar to frame 12 other than that the forward portion of top member 226, which is to say that portion forwardly of step 34 in the embodiment of FIG. 1, is removed, thereby forming a cut out 234. Lens 250 along its upper edge 260 is provided with a frame filler piece 262 which, is proportioned such that when lens 250 is inserted into frame 212, the filler piece 262 blends smoothly with the surrounding portions of top member 226. The ends 242 of filler piece 262 are shaped to engage mating detents 264 formed on frame 212 on the end walls of cut out 234.

It will be apparent that many changes may be made to the preferred, illustrative embodiments within the scope of the invention, and it is intended that they fall within the spirit of the claims appended hereto.

I claim:

1. Eyewear of a type supported by temples comprising:

a unitary lens, and a hard frame comprising opposed side portions and a nose portion bridging between said side portions, the inner periphery of said portions and said nose portion having a continuous channel extending therealong;

said frame further including a top member interconnecting said side portions adjacent their upper ends, at least a portion of said top member being movable between a first position wherein said channel is open along its length so as to permit said lens to be inserted into said channel, and a second position wherein said top member portion acts to lock said lens into said channel.

2. Eyewear as defined in claim 1, wherein said top member comprises a portion permanently secured to said side portions forwardly of said channel therein.

3. Eyewear as defined in claim 1, wherein said top member is slotted along its length to communicate with said channel.

4. Eyewear as defined in claim 3, wherein said top member is downwardly stepped rearwardly of said channel, and said movable top member portion has a complementary form to said downward step.

5. Eyewear as defined in claim 4, wherein said movable top member portion is hingedly secured adjacent one end thereof to said frame.

6. Eyewear as defined in claim 3, wherein said movable top member portion is secured to said lens.

7. Eyewear as defined in claim 2, wherein said nose portion interconnects with said permanently secured top member portion.

8. Eyewear as defined in claim 1, wherein said channel has a non-uniform depth in preselected portions thereof along its length.

9. Eyewear as defined in claim 8, wherein said frame is provided with at least one opening intersecting said channel.

10. Eyewear as defined in claim 1, wherein the locus of peripheral points of the lens in medial horizontal section differs from the locus of comparable points on said channel, when said lens is disengaged from said channel, whereby when said lens is engaged in said channel, at least one of said lens and said frame is marginally distorted about a vertical center line thereby tending to wedge said lens into said frame.

* * * * *

UNITED STATES PATENT AND TRADEMARK OFFICE
CERTIFICATE OF CORRECTION

| | | |
|---|---|---|
| PATENT NO. | : 4,879,770 | Page 1 of 1 |
| APPLICATION NO. | : 07/115794 | |
| DATED | : November 14, 1989 | |
| INVENTOR(S) | : Steven J. Vacilotto | |

It is certified that error appears in the above-identified patent and that said Letters Patent is hereby corrected as shown below:

Title Page, below Item (54) should read

--[76] Inventor: Steven J. Vacilotto, Thornhill, Ontario (CA)--

Signed and Sealed this

Twenty-sixth Day of May, 2015

Michelle K. Lee
*Deputy Director of the United States Patent and Trademark Office*